Jan 6, 1931. G. M. SCHNEPF 1,787,765
EARTH SPREADER AND LEVELER
Filed Nov. 14, 1927
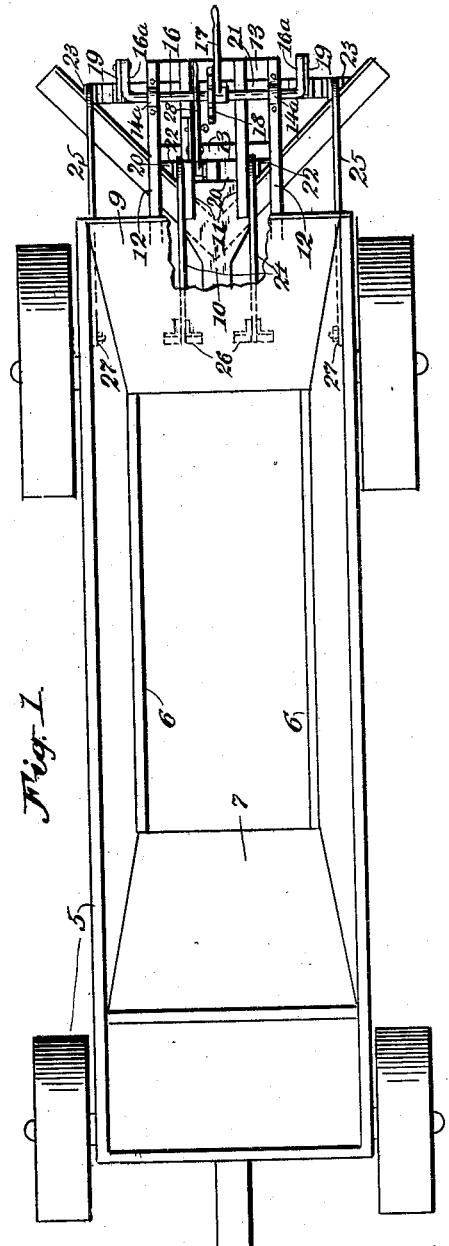
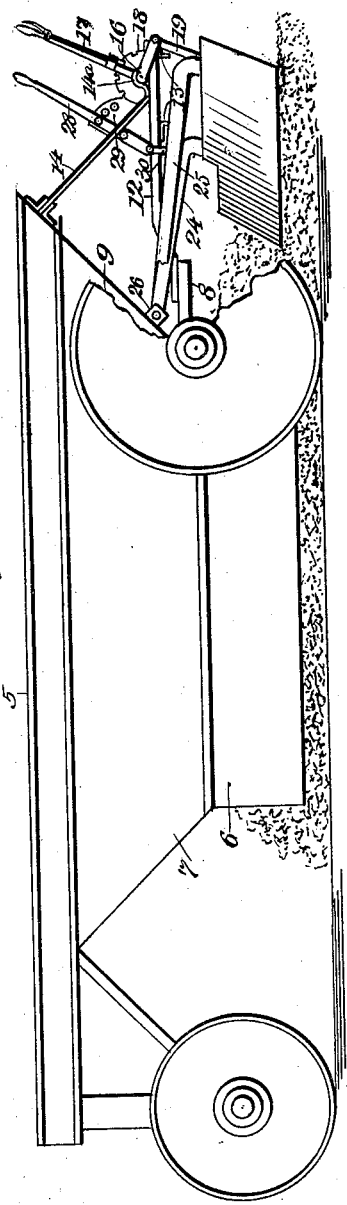
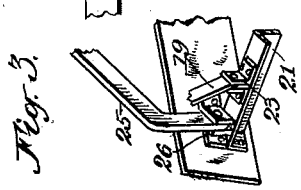
Inventor
George M. Schnepf
By J. M. St. John
Attorney Patented Jan. 6, 1931

1,787,765

UNITED STATES PATENT OFFICE

GEORGE M. SCHNEPF, OF CONOWINGO, MARYLAND

EARTH SPREADER AND LEVELER

Application filed November 14, 1927. Serial No. 233,148.

This invention relates to the spreading and leveling of earth and broken stone, more especially in road construction, and has for its object to provide for this purpose simple and efficient mechanism adapted for attachment to the rear of dump wagons, cars or trailers.

The nature of the invention is fully disclosed in the description and claims following, reference being had to the accompanying drawing, in which:

Figure 1 is a plan view of apparatus embodying my invention as applied to a dump-wagon. Fig. 2 is a side elevation of the same, a part of one of the wagon wheels being broken away the better to show the mechanism and its mounting. Fig. 3 is a fragmentary view in perspective showing details of the spreader not clearly illustrated elsewhere.

In the drawing, the numeral 5 denotes a heavy duty dump-wagon having a collapsible bottom 6 arranged for dropping the load between the front and rear wheels from the hopper-like body 7. A rigid draw-bar 8 projects backwardly from the body, which latter inclines at 9 as shown. Other details of the dump-wagon are not essential to an understanding of this invention.

To the draw-bar is rigidly secured a support for the spreading mechanism to be described presently. This support in its entirety forms a frame composed essentially of a middle yoke portion, a forward plate 10 and attached rearwardly extending side members 11. To these outlying members 12 are connected cross-bars 13. Suspending braces 14 connect by stirrups 16 with the rear of the dumpwagon near the top and to the outer side-bars 12 near their rear ends, the suspending braces being bent at 14a to form bearings for a rock-shaft 16 provided with terminal crank-arms 16a. A hand-lever 17 attached to the rock-shaft engages the sector 18. The crank-arms connect by links 19 with the rear part of the spreading plow, as will appear presently. By this means the plow at the rear may be raised or depressed at pleasure.

The plow, or spreader proper is herein shown as the V-type, having a pair of blades joined at an angle in front, and diverging backwardly. The blades are connected transversely by tie-bars 20 and 21. Connecting pivotally with the plow, as by lugs 22 and 23, are beams or drag-bars 24 and 25, with similar connections at 26 and 27 with the rear end of the dump wagon. A hand-lever 28 pivoted to a sector 29 is linked by the member 30 to the forward cross-bar 20. The rear hand-lever above described connects similarly with the rear cross-bar. It will be evident that by means of these levers the plow may be raised or depressed, and tilted in the line of advance, as conditions may require.

The operation of the device is simple, and will be readily apparent. The plow being set by the levers to the desired elevation above the ground, the load is dumped, and as the dump-wagon moves forward the pile of dumped material is spread divergently and to a uniform level by the spreader plow. This first operation in the disposition of the formidable pile of material is thus performed by a dump-wagon accessory, and without the need of an auxiliary power unit, or laborious hand labor.

The term level in the preceding paragraph refers more particularly to the advance of the machine, rather than the surface considered laterally, though in the case of perfectly flat surfaces, such as most roadways as now generally built, it applies to both. In some cases, however, it is desirable to crown the roadway in the middle for the sake of better drainage, or otherwise, when, as will be evident, the desired result is attained by elevating the nose of the V-plow with respect to the flaring wings thereof. When, as in the case of city alleys, the middle of the roadway is hollowed, this may be done by depressing the nose with respect to the wings. These movements are made possible by the pivotal mounting of the plow and the use of fore and aft levers, as described.

Having thus described my invention, I claim:

1. A leveling device for dumping apparatus, comprising a rigid rearwardly extending support carried by the dumping apparatus, a spreading plow hung by drag-bars pivotally for vertical movement from rigid parts of the dumping apparatus, and means connecting said support and the plow whereby it may be elevated, depressed and tilted fore and aft.

2. A leveling device for dumping apparatus, comprising a spreader with rearwardly diverging blades, connecting cross-bars therefore, drag-bars connecting pivotally for vertical movement with fixed parts at the rear of the dumping apparatus, a rigid supporting member extending rearwardly from the dumping apparatus, and hand-levers connecting liftably with the spreader at its front and rear, whereby the spreader may be set to any desired elevation or fore and aft tilt.

3. Combined with dumping apparatus, a rigid rearwardly extending supporting member, a spreader attached pivotally for vertical movement by drag-bars to rigid parts of the dumping apparatus, and raising and lowering means connecting the spreader at its front and rear with said supporting member.

In testimony whereof I affix my signature.

GEORGE M. SCHNEPF.